(12) United States Patent
Nose et al.

(10) Patent No.: US 7,324,781 B2
(45) Date of Patent: Jan. 29, 2008

(54) AUTOMATIC DOCUMENT TRANSPORTATION DEVICE

(75) Inventors: Yoshitaka Nose, Kyoto (JP); Naritoshi Takamatsu, Nara (JP); Kenji Koyama, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 324 days.

(21) Appl. No.: 11/023,250

(22) Filed: Dec. 21, 2004

(65) Prior Publication Data

US 2005/0147438 A1 Jul. 7, 2005

(30) Foreign Application Priority Data

Jan. 5, 2004 (JP) .............................. 2004-000213

(51) Int. Cl.
*G03G 15/00* (2006.01)

(52) U.S. Cl. ........................................ 399/367; 399/370

(58) Field of Classification Search ..................... None
See application file for complete search history.

(56) References Cited

U.S. PATENT DOCUMENTS

| | | | | |
|---|---|---|---|---|
| 5,680,204 | A * | 10/1997 | Ferrara ........................ | 399/364 |
| 5,751,438 | A * | 5/1998 | Murai et al. ................. | 358/403 |
| 5,903,811 | A * | 5/1999 | Kobayashi et al. .......... | 399/367 |
| 5,946,527 | A * | 8/1999 | Salgado et al. ............... | 399/82 |
| 6,151,478 | A * | 11/2000 | Katsuta et al. .............. | 399/372 |
| 6,672,579 | B2 * | 1/2004 | Araki et al. ................. | 271/122 |
| 6,934,501 | B2 * | 8/2005 | Kawai et al. ................ | 399/367 |
| 2003/0006544 | A1 | 1/2003 | Iino et al. | |

FOREIGN PATENT DOCUMENTS

| | | |
|---|---|---|
| CN | 1392456 | 1/2003 |
| JP | 08-133551 | 5/1996 |
| JP | 2003-309703 | 10/2003 |
| JP | 2003-315934 | 11/2003 |
| JP | 2003-324579 | 11/2003 |
| JP | 2003315934 | 11/2003 |

* cited by examiner

*Primary Examiner*—Anthony H. Nguyen
(74) *Attorney, Agent, or Firm*—Hogan & Hartson LLP

(57) ABSTRACT

An automatic document transportation device includes a document tray, a document discharge tray, a transportation path, a document feed roller, a separating pad, transportation rollers, a Charge Coupled Device (CCD) scanning unit, a Contact Image Sensor (CIS) scanning unit and document discharge rollers. The document tray and the document discharge tray are provided vertically in two stages. The transportation path is formed in the sideways letter-U shape from the document tray to the document discharge tray. The document feed roller and the separating pad are provided in proximity to an inlet of the transportation path, and separate original documents by nipping the original documents in a thickness direction. The transportation rollers nip and transport the original document. The CCD scanning unit is provided directly downstream of a U-turn part of the transportation path and scans a first side of the transported original document. The CIS scanning unit is provided at downstream of the CCD scanning unit and scans a second side of the original document. The document discharge rollers nip and discharged the scanned original document. In a lateral cross-section of the automatic document transportation device, the CIS scanning unit is provided between and below the separating pad and the transportation roller provided directly downstream of the separating pad, and between the CCD scanning unit and the document discharge rollers.

20 Claims, 8 Drawing Sheets

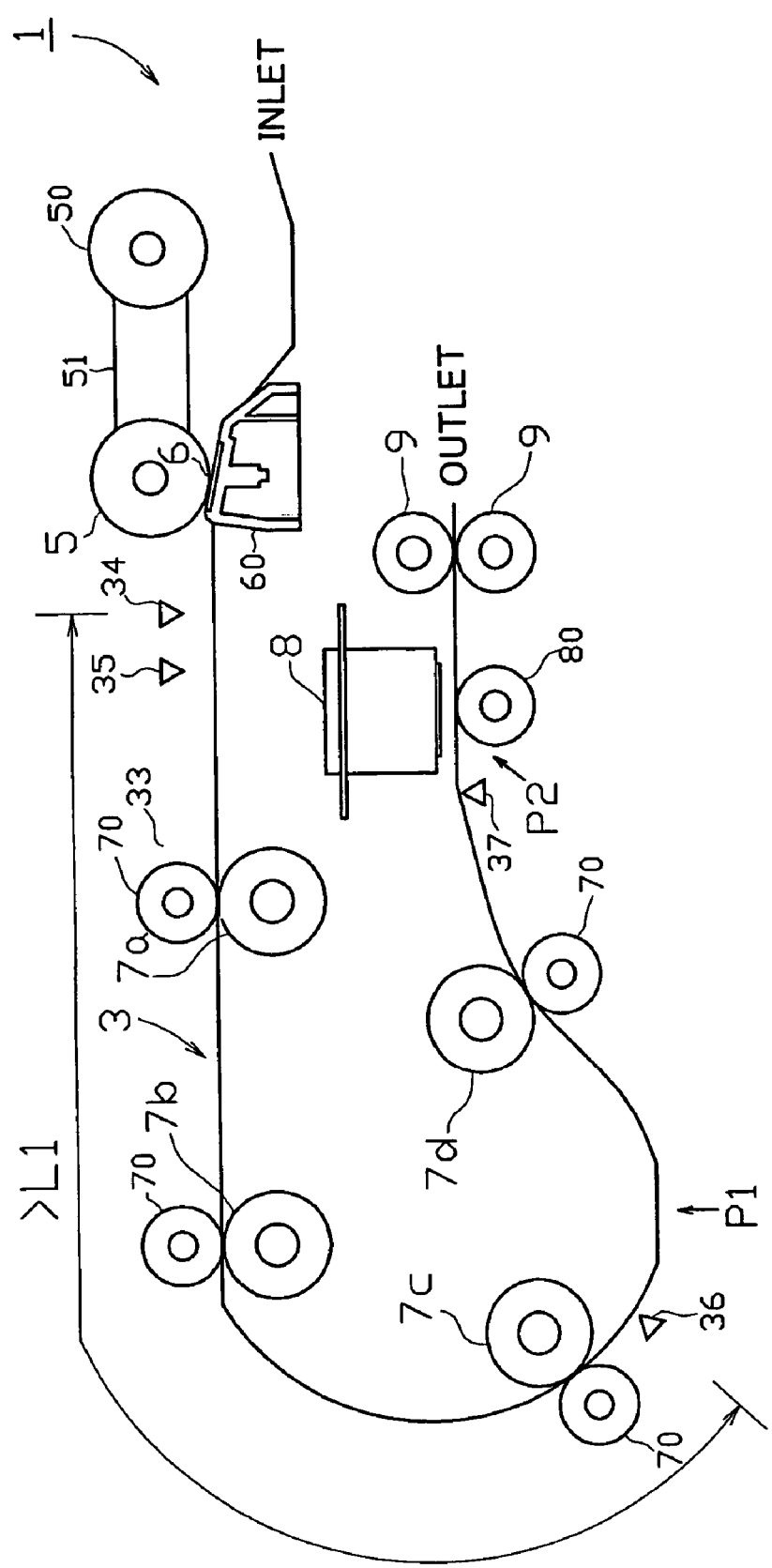

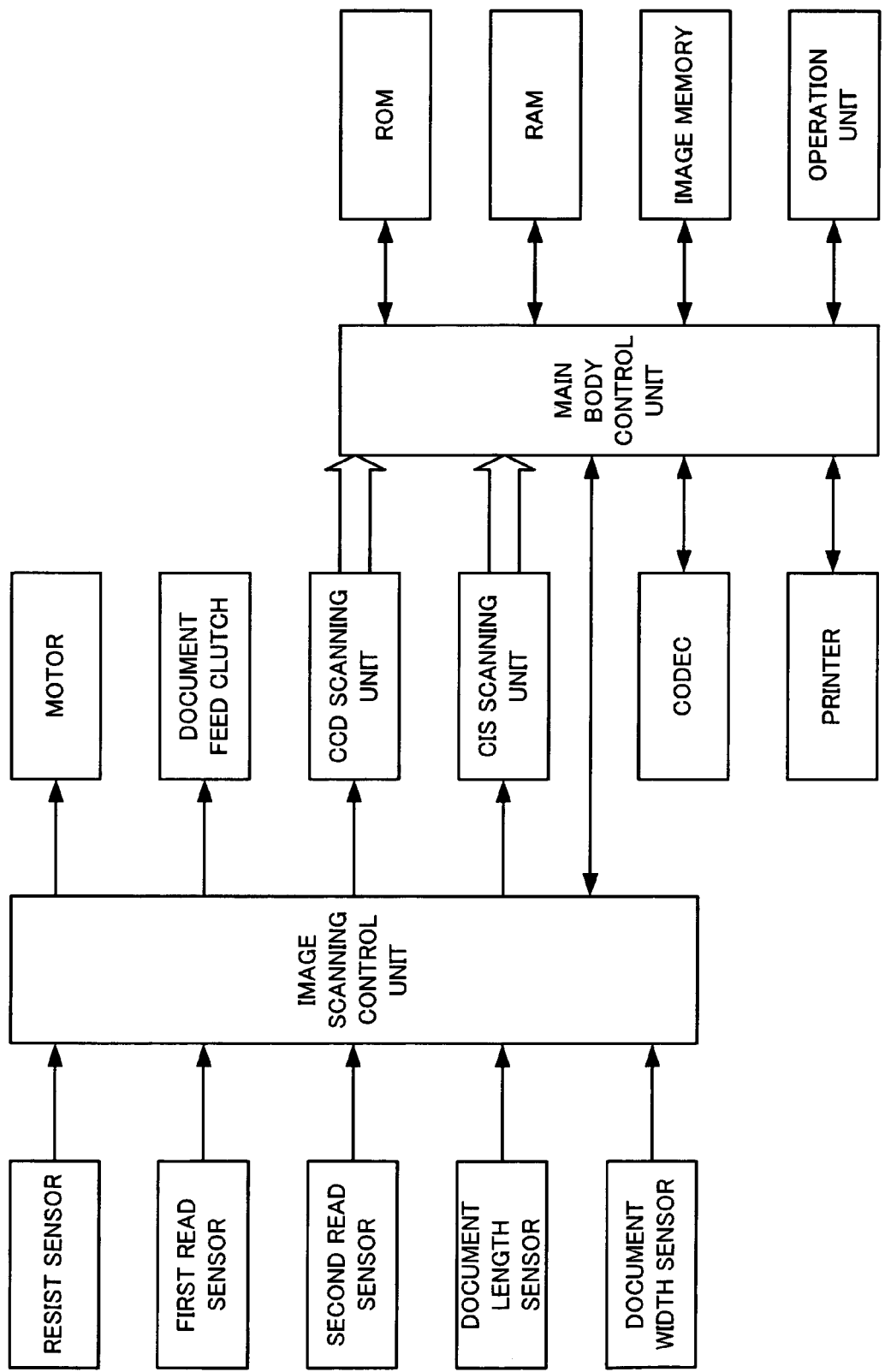

AUTOMATIC DOCUMENT TRANSPORTATION DEVICE

BACKGROUND OF THE INVENTION

1. Field of the Invention

The present invention relates to an automatic document transportation device in a scanner, a facsimile machine and a copy machine or the like, which transports an original document on a document tray through a transportation path to a scanning position and a document discharge tray.

2. Description of Related Art

A scanner, a facsimile machine and a copy machine or the like include an automatic document transportation device having an Automatic Document Feeder (ADF) which sequentially feeds a plurality of original documents. By using the automatic document transportation device, a plurality of original documents placed on a document tray can be transported continuously and automatically to a scanning position.

FIG. 8 is a cross-sectional view showing the ADF of a copy-and-facsimile Multi Function Peripheral (MFP) 900. An original document on a document tray 901 is transported by the ADF to a document discharge tray 902 provided below the document tray 901, from an upper side to a lower side in a U-turn manner. In the transportation process, an image of the original document is scanned by an image scanning unit such as a Charge Coupled Device (CCD). Specifically, as shown in the drawing, a transportation path 903 is formed from the document tray 901 to the document discharge tray 902. The original documents on the document tray 901 are transported continuously to the document discharge tray 902 by a document feed roller 904 provided in proximity to an inlet of the transportation path 903 and transportation rollers 905 provided appropriately along the transportation path 903. While the original document picked up from the document tray 901 is transported through the transportation path 903, an image scanning process is executed on one side of the original document by a CCD scanning unit 906. Downstream of the CCD scanning unit 906, an image scanning process is executed on another side of the original document by a Contact Image Sensor (CIS) scanning unit 907.

In the ADF, a document length sensor 908 and a document width sensor 909 are provided along the transportation path 903 for automatically distinguishing a document size before scanning an image of the original document. The document length sensor 908 detects a leading edge and a trailing edge of the transported original document. The document width sensor 909 includes a plurality of sensors arranged in a width direction of the transportation path 903. In accordance with each of the detection signals of the document length sensor 908 and the document width sensor 909, a control unit (not shown) distinguishes the document size before scanning the original document. Meanwhile, a sensor can be provided on the document tray 901 and the sensor can distinguish the document size. Compared with this case, the document length sensor 908 and the document width sensor 909 are advantageous in distinguishing the document size when original documents of different sizes are placed on the document tray 901.

Although not shown in the drawing, a reversal path can be formed from a downstream side to an upstream side of the CCD scanning unit 906. In a first pass of the original document, the document size can be distinguished by a pre-scanning process of the CCD scanning unit 906. Then, the original document can be returned via the reversal path. In a second pass of the original document, an image scanning process can be carried out by the CCD scanning unit 906.

As described above, in case the CIS scanning unit 907 is provided at an inner side of the transportation path 903, the automatic document transportation device is required to have a certain height so that the CIS scanning unit 907 does not interfere with other constituent members such as the transportation rollers 905. For example, in proximity to the inlet of the transportation path 903, a retard roller 910 for separating the original documents is provided facing the document feed roller 904 across the transportation path 903. The transportation rollers 905 are provided facing one another at the inner side and an outer side of the transportation path 903. Meanwhile, in proximity to an outlet of the transportation path 903, the CIS scanning unit 907 and the document discharge roller 911 are provided. In the transportation path 903 having the sideways letter-U shape, the transportation path in proximity to the inlet and the transportation path in proximity to the outlet are provided vertically in two stages. Therefore, the transportation path in proximity to the inlet and the transportation path in proximity to the outlet are required to be separated from one another for at least the height of these constituent members. However, in case a Flat Bed Scanner (FBS) is provided in the copy-and-facsimile MFP 900, the document pressing cover includes the ADF which is the automatic document transportation device. The ADF is opened and closed along with the document pressing cover. Therefore, the height of the ADF is preferable to be low.

In the conventional automatic document transportation device, for example, to distinguish whether or not a document length is a document length of a portrait direction of A4 size paper by the document length sensor 908 before scanning an image by the CCD scanning unit 906, a transportation path length from the document length sensor 908 to a read sensor 912 of the CCD scanning unit 906 is required to be the document length of the portrait direction of the A4 size paper or longer. Therefore, as shown in the drawing, the transportation path 903 is formed so that the outlet is located at an inward position compared with the inlet. Furthermore, the document tray 901 is provided at the inlet. Therefore, the original documents discharged onto the document discharge tray 902 are difficult to be confirmed visually and the original documents are difficult to be taken out. Moreover, in case the reversal path is formed and the image scanning process is carried out by passing the original document twice, if the original documents of different sizes are mixed, the pre-scanning process is required to be carried out for each of the original documents. Therefore, a period of time required for the image scanning process becomes long.

SUMMARY OF THE INVENTION

The present invention has been made in consideration of the above-described drawbacks. An advantage of the present invention is to provide a way to reduce a height of an automatic document transportation device in which a second scanning unit is provided at an inner side of a transportation path. Another advantage of the present invention is to provide a way to facilitate an original document discharged from an outlet to be confirmed visually and to be taken out in an automatic document transportation device, in particular, an automatic document transportation device in which a size sensor for detecting a document length is provided at a transportation path and an image scanning process is carried out by one pass of the original document.

According to an aspect of the present invention, an automatic document transportation device includes a document tray, a document discharge tray, a transportation path, a document separating unit, transportation rollers, a first scanning unit, a second scanning unit and document discharge rollers. The document tray and the document discharge tray are provided vertically in two stages. The transportation path is formed in a sideways letter U-shape from the document tray to the document discharge tray. The document separating unit is provided in proximity to an inlet of the transportation path. The document separating unit separates original documents fed from the document tray by nipping the original documents in a thickness direction. The transportation rollers are provided appropriately along the transportation path. The transportation rollers nip and transport the original document. The first scanning unit is provided at an outer side of the transportation path directly downstream of a U-turn part of the transportation path. The first scanning unit scans a first side of the transported original document. The second scanning unit is provided at an inner side of the transportation path downstream of a scanning position of the first scanning unit. The second scanning unit scans a second side of the transported original document. The document discharge rollers are provided in proximity to the outlet of the transportation path. The document discharge rollers nip the scanned original document and discharge the original document onto the document discharge tray. In a lateral cross-section of the automatic document transportation device, the second scanning unit is provided between and below the document separating unit and the transportation roller provided directly downstream of the document separating unit, and between the first scanning unit and the document discharge rollers.

According to an aspect of the present invention, the document discharge rollers are provided approximately below the document separating unit, at a position on the transportation path displaced with respect to the document separating unit.

According to an aspect of the present invention, a size sensor for detecting a leading edge and a trailing edge of the transported original document is provided at the transportation path upstream of the first scanning unit. A read sensor for controlling a scanning operation is provided directly upstream of the first scanning unit. A transportation path length from the size sensor to the read sensor is longer than a document length for distinguishing a maximum scannable document size.

According to the present invention, the second scanning unit provided at the inner side of the transportation path is provided between and below the document separating unit provided in proximity to the inlet of the transportation path and the transportation roller provided directly downstream of the document separating unit, and between the first scanning unit provided directly downstream of the U-turn part and the document discharge rollers provided in proximity to the outlet. Therefore, the document separating unit, the transportation rollers, the first scanning unit, the second scanning unit and the document discharge rollers can be provided efficiently without interfering with one another along the transportation path formed in the sideways letter-U shape from the document tray to the document discharge tray. As a result, the height of the automatic document transportation device can be reduced.

According to the present invention, the document discharge rollers are provided approximately below the document separating unit, at a position on the transportation path displaced with respect to the document separating unit. Therefore, the automatic document transportation device of the present invention is advantageous in that the original document discharged from the outlet can easily be confirmed visually and can easily be taken out. In particular, the automatic document transportation device of the present invention is useful in a structure in which the size sensor for detecting the leading edge and the trailing edge of the transported original document is provided at the transportation path upstream of the first scanning unit, the read sensor for controlling the scanning operation is provided directly upstream of the first scanning unit and the transportation path length from the size sensor to the read sensor is longer than the document length for distinguishing the maximum scannable document size.

BRIEF DESCRIPTION OF THE SEVERAL VIEWS OF THE DRAWINGS

FIG. 6 schematically shows a layout of the ADF 1.

FIG. 7 is a block diagram showing a control configuration of the copy-and-facsimile MFP 100.

DETAILED DESCRIPTION OF THE INVENTION

Figure 1:
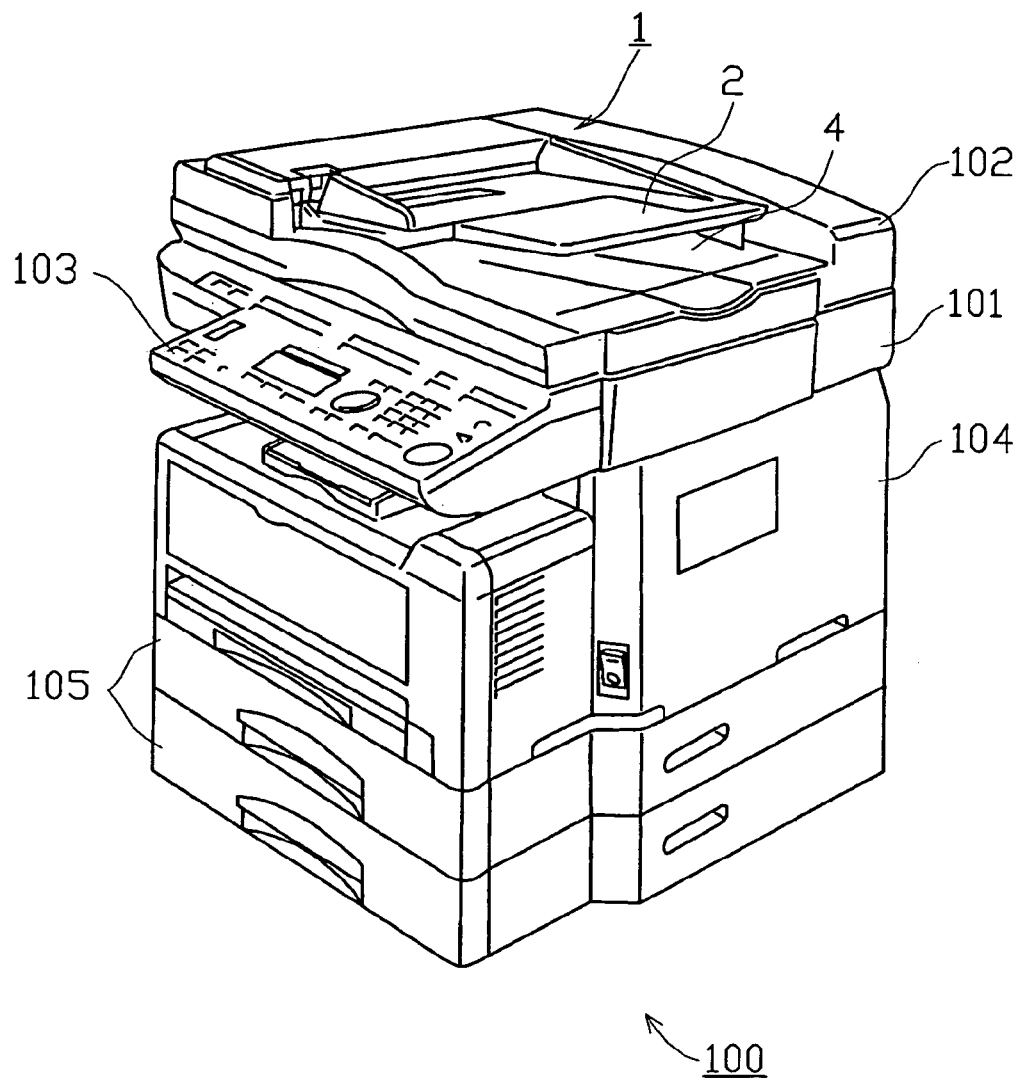
FIG. 1 is a perspective view showing a schematic structure of a copy-and-facsimile MFP 100 according to an embodiment of the present invention.

FIG. 1 shows an exterior of a copy-and-facsimile MFP 100 having an automatic document transportation device 1 according to an embodiment of the present invention. As shown in the drawing, the copy-and-facsimile MFP 100 includes a scanning table 101, a document pressing cover 102, an operation panel 103, a frame 104 and paper feed cassettes 105. The scanning table 101 functions as a Flat Bed Scanner (FBS). The document pressing cover 102 is supported axially on the scanning table 101 in a manner capable of being opened and closed. The operation panel 103 is operated for, for example, inputting a start of a scanning process of an original document. The frame 104 includes an image printing unit which prints an image onto recording paper and a transmission unit which electrically transmits the image, or the like. The paper feed cassettes 105 feed recording papers for printing the scanned image. In the copy-and-facsimile MFP 100, an automatic document transportation device is formed by an ADF 1 in the document pressing cover 102. An original document on a document tray 2 is transported by the ADF 1 to a document discharge tray 4 provided below the document tray 2, from an upper side to a lower side in a U-turn manner. In the transportation process, an image scanning process is carried out. Further, the structure of the copy-and-facsimile MFP 100 is an example. The structures such as the image printing unit, the transmission unit for electrically transmitting the image and the paper feed cassettes for feeding the recording papers for printing the scanned image are optional.

Figure 2:
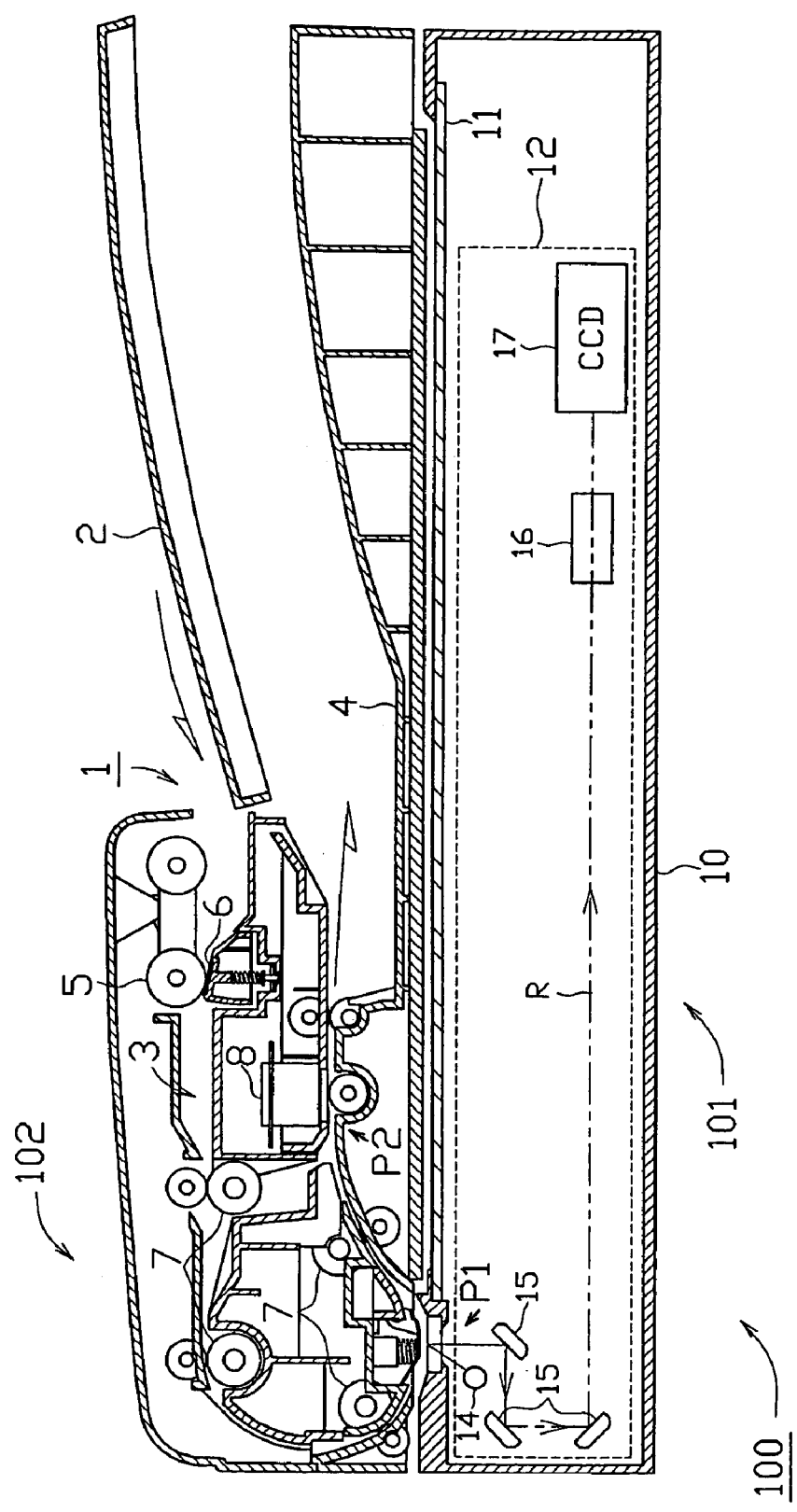
FIG. 2 is a cross-sectional view showing an upper structure of the copy-and-facsimile MFP 100.

As shown in FIG. 2, in the scanning table 101, a platen glass 11 is provided on an upper surface of an approximately rectangular parallelepiped housing 10. The housing 10 includes a CCD scanning unit 12. The CCD scanning unit 12 is a scanning unit of a so-called reduced optical system. As shown in the drawing, the CCD scanning unit 12 includes a light source 14, reflecting mirrors 15, a light-gathering lens 16 and a CCD image sensor 17. The light source 14 irradiates light to a scanning position P1. The reflecting mirrors 15 guide reflected light R from the original document to a prescribed direction. The light-gathering lens 16 focuses the reflected light R. The CCD image sensor 17 converts the focused light into an electric signal and outputs the electric signal. When the above-described CCD scanning unit 12 functions as the FBS, the CCD scanning unit 12 moves horizontally with respect to the platen glass 11 to scan the original document on the platen glass 11. When using the automatic document transportation device 1, the CCD scanning unit 12 moves to the scanning position P1 to scan an image of the original document transported through a transportation path 3. Then, the reflected light R from the original document is guided to the CCD image sensor 17 and an image is formed. Further, although not shown in the drawing, an analog-to-digital conversion and a shading process or the like are executed on an image signal which has been scanned by the CCD scanning unit 12 and converted into an electric signal. Then, the image signal is printed out onto the recording paper by the image printing unit such as a printer or transmitted electrically by a transmission unit such as a codec.

Figure 3:
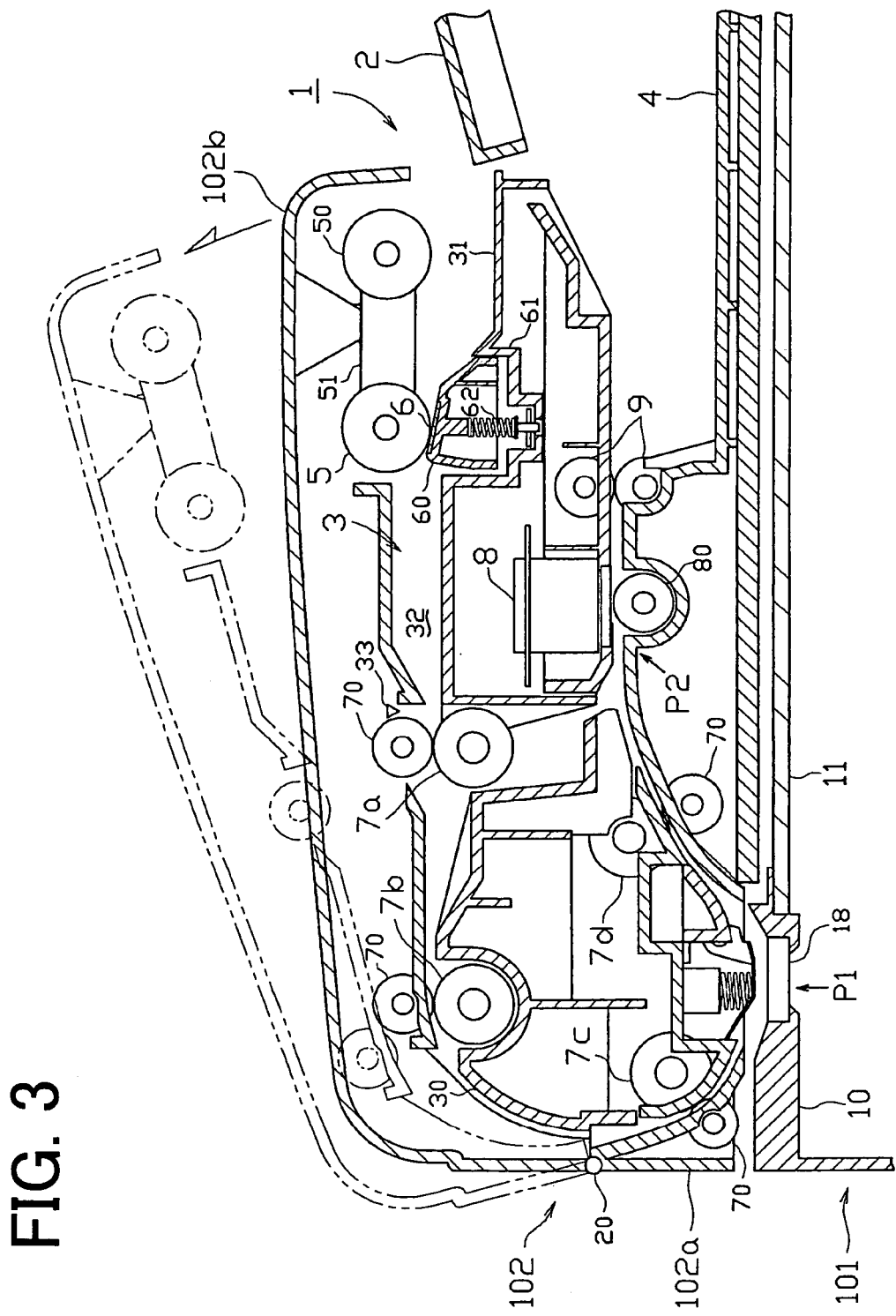
FIG. 3 is an enlarged cross-sectional view showing a structure of an ADF 1.

As shown in FIGS. 2 and 3, the automatic document transportation device to be described below is provided as the ADF 1 in the document pressing cover 102. The automatic document transportation device continuously transports the original documents to scanning positions P1 and P2. The automatic document transportation device includes the document tray 2, the document discharge tray 4, the transportation path 3, a document feed roller 5 and a separating pad 6 (a document separating unit), transportation rollers 7, the CCD scanning unit 12 (a first scanning unit), a CIS scanning unit 8 (a second scanning unit) and document discharge rollers 9. The document tray 2 and the document discharge tray 4 are provided vertically in two stages. The transportation path 3 is formed in a sideways letter-U shape from the document tray 2 to the document discharge tray 4. The document feed roller 5 and the separating pad 6 are provided in proximity to an inlet of the transportation path 3. The document feed roller 5 and the separating pad 6 separate the original documents fed from the document tray 2 by nipping the original documents in a thickness direction. The transportation rollers 7 are provided appropriately along the transportation path 3. The transportation rollers 7 nip and transport the original document. The CCD scanning unit 12 is provided at an outer side of the transportation path 3 directly downstream of a U-turn part of the transportation path 3. The CCD scanning unit 12 scans a first side of the transported original document. The CIS scanning unit 8 is provided at an inner side of the transportation path 3 downstream of the CCD scanning unit 12. The CIS scanning unit 8 scans a second side of the transported original document at the scanning position P2. The document discharge rollers 9 are provided in proximity to an outlet of the transportation path 3. The document discharge rollers 9 nip the scanned original document and discharge the original document onto the document discharge tray 4. The original document on the document tray 2 is fed into the transportation path 3 by the ADF 1. The original document is transported along the transportation path 3 having the sideways letter-U shape by being reversed so as to make a U-turn from an upper side to a lower side. Then, the original document reaches the scanning position P1. When the original document passes the scanning position P1, the CCD scanning unit 12 scans an image on the first side of the original document. The original document is transported further along the transportation path 3 and reaches the scanning position P2. When the original document passes the scanning position P2, the CIS scanning unit 8 scans an image on the second side of the original document. Then, the original document is discharged onto the document discharge tray 4 located below the document tray 2. Therefore, the image on both sides of the original document can be scanned by passing the original document once, in other words, by a so-called one pass.

At an upper part of the document pressing cover 102, the document tray 2 is provided slightly slanting toward a direction to feed the original document. On an upper surface of the document tray 2, a plurality of the original documents before the scanning process are stacked. In case a user places an original document on the document tray 2, the user places a leading edge of the original document at a lower end of the slanted document tray 2 so that the leading edge of the original document is inserted to the inlet of the transportation path 3. Further, although not shown in the drawing, a movable guide is provided on the document tray 2 for regulating a position of the original document in a width direction and preventing a skew of the original document.

The transportation path 3 is formed in the sideways letter-U shape so as to connect the document tray 2 and the document discharge tray 4 provided vertically in two stages. The transportation path 3 passes the platen glass 18 at the scanning position P1 directly downstream of the U-turn part, passes the scanning position P2 at the downstream of the scanning position P1 and is connected to the document discharge tray 4. A paper guide 30 and an intermediate guide 31 provided in the document pressing cover 102 form an inner guide surface of the transportation path 3. A cover frame 102a and an ADF cover 102b of the document pressing cover 102 form an outer guide surface of the transportation path 3. Accordingly, an original document of a prescribed thickness can pass through the transportation path 3.

The cover frame 102a is a housing of the document pressing cover 102. The paper guide 30 and the intermediate guide 31 or the like are mounted on the cover frame 102a. The outer guide surface of the transportation path 3 and the document discharge tray 4 are formed integrally on the cover frame 102a. Meanwhile, the ADF cover 102b mainly forms an upper part of the housing of the document pressing cover 102. The ADF cover 102b is provided on the cover frame 102a in a manner capable of being swung with a downstream side of a document transportation direction as a center of the swing.

Specifically, as shown in FIG. 3, the ADF cover 102b constitutes a sidewall and a top plate of the document pressing cover 102 located on a side where the ADF 1 is provided. A lower end of the sidewall part of the ADF cover 102b is supported on the cover frame 102a via a spindle 20. Therefore, by lifting up an upstream side of the transportation direction of the ADF cover 102b, in other words, by lifting up a side of the ADF cover 102b located next to the document tray 2, the ADF cover 102b can be opened and closed with the spindle 20 as the center of the swing. By opening the ADF cover 102*b*, an inner configuration of the document pressing cover 102 such as the separating pad 6 and the transportation rollers 7 is exposed. Accordingly, maintenance work and removal of jammed paper can be carried out. A lower surface of the ADF cover 102*b* and the cover frame 102*a* constitute the outer guide surface of the transportation path 3.

Figure 4:
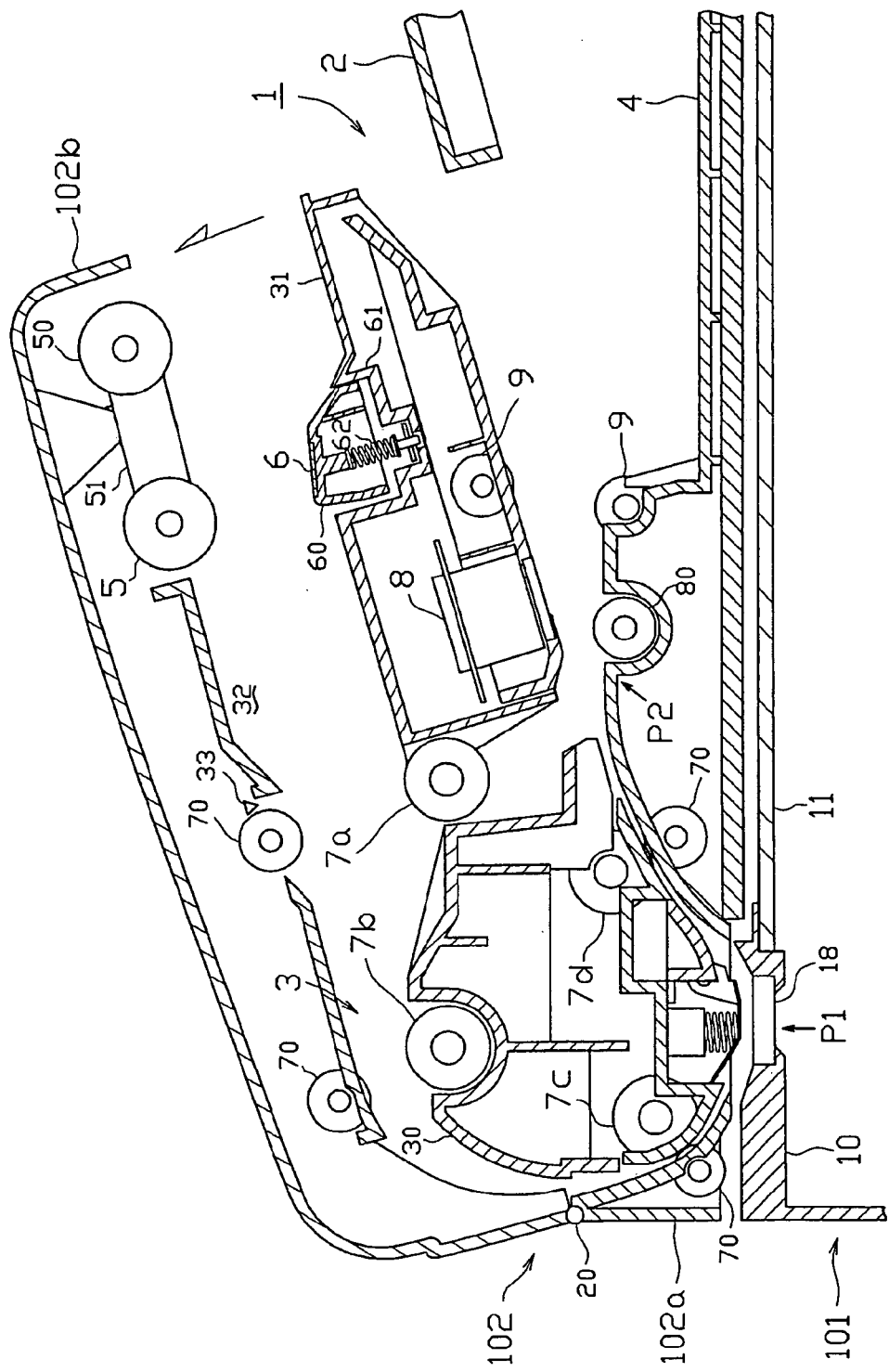
FIG. 4 is an enlarged cross-sectional view showing the ADF 1 under a state in which an ADF cover 102*b* is opened.

The paper guide 30 forms the inner guide surface of the transportation path 3 in proximity to the U-turn part. The transportation rollers 7 or the like are provided appropriately along the paper guide 30. The paper guide 30 is fixed on the cover frame 102*a*. Meanwhile, the intermediate guide 31 forms the inner guide surface of the transportation path 3 upstream and downstream of the U-turn part. That is, an upper surface of the intermediate guide 31 is the inner guide surface in proximity to the inlet of the transportation path 3. A lower surface of the intermediate guide 31 is the inner guide surface in proximity to the outlet of the transportation path 3. As shown in FIG. 4, the intermediate guide 31 is provided in a manner capable of being opened and closed with a downstream end of the upper surface as a center of the swing. By opening the intermediate guide 31, the CIS scanning unit 8 and the document discharge rollers 9 or the like are exposed. Accordingly, maintenance work and removal of jammed paper can be carried out.

Further, the outer guide member of the transportation path 3 is not limited to the cover frame 102*a* or the like described in the present embodiment. Other forms can be adopted for the outer guide member of the transportation path 3 without departing from the scope of the present invention. If the cover frame 102*a* and the ADF cover 102*b* of the document pressing cover 102 are formed integrally by plastic materials so as to function also as the outer guide member, a number of components can be reduced and an assembling process can be carried out easily. The above-described structure of the transportation path 3 is one example and can be changed into a structure of a known transportation path without departing from the scope of the present invention. For example, instead of the paper guide 30, a transportation drum having a large diameter can be provided.

The document feed roller 5 is provided in proximity to the inlet of the transportation path 3. The document feed roller 5 rotates while making contract with the original document fed from the document tray 2 and feeds the original document into the transportation path 3. The separating pad 6 is pressed against the document feed roller 5 and multi-fed original documents are separated. Although details are not shown in the drawing, a roller body made of silicon or Ethylene-Propylene-Diene Methylene linkage (EPDM) is fixed on a metal roller shaft via a one-way crutch to form the document feed roller 5. The document feed roller 5 is provided at the outer side of the transportation path 3 in proximity to the inlet of the transportation path 3. The roller shaft of the document feed roller 5 is supported on the ADF cover 102*b*. When the ADF cover 102*b* is opened, the document feed roller 5 also swings upward with the ADF cover 102*b*.

Meanwhile, a coefficient of friction of the separating pad 6 with respect to the original document is lower than a coefficient of friction of the roller body of the document feed roller 5 with respect to the original document and higher than a coefficient of friction between the original documents. For example, the separating pad 6 can be formed by urethane resin. The separating pad 6 is adhered on an upper surface of a separating pad holder 60. A mounting hole 61 is formed on the upper surface of the intermediate guide 31. The separating pad holder 60 is fit in the mounting hole 61 in a manner capable of being rocked. The separating pad holder 60 is urged upward by a coil spring 62 provided in the mounting hole 61. Accordingly, the separating pad 6 makes contact with the roller body of the document feed roller 5. When the original document passes though the document feed roller 5 and the separating pad 6, the separating pad holder 60 swings downward according to the thickness of the original document. The original documents fed into the transportation path 3 by the document feed roller 5 and the separating pad 6 are separated one sheet at a time and transported sequentially. The original document transported into the transportation path 3 is nipped by the transportation rollers 7 and transported to the scanning positions P1 and P2. When the original document is nipped by the transportation rollers 7, the roller body of the document feed roller 5 becomes rotatable in the document transportation direction with respect to the roller shaft by the one-way clutch. Accordingly, the rotation of the roller body follows the original document transported by the transportation rollers 7 so that the transportation of the original document is not influenced by the nip of the document feed roller 5 and the separating pad 6. As a result, a vibration of the original document is prevented from generating.

A pickup roller 50 is provided upstream of the document feed roller 5. The pickup roller 50 is supported rotatably by pickup arms 51 which are swung vertically by a document feed clutch (not shown). The pickup arms 51 are a pair of arms which sandwich the pickup roller 50 rotatably. A base end of the pickup arms 51 are held rotatably on a roller shaft of the document feed roller 5. A tip end of the pickup arms 51 extend toward the document tray 2 and support the pickup roller 53. Under a standby state when the original document is placed onto the document tray 2, the tip end of the pickup arms 51 elevate and the pickup roller 50 separates from the intermediate guide 31. When picking up the original document, the tip end of the pickup arms 51 swing downward so that the pickup roller 50 descends to make contact with an uppermost sheet of the original documents on the document tray 2. The pickup roller 50 rotates while making contact with the original document on the document tray 2 and feeds the original document to the document feed roller 5.

Although not shown in the drawing, a document set sensor detects the presence or the absence of an original document on the document tray 2. In accordance with a detection signal, a control unit controls a movement of the pickup roller 50, the pickup arms 51, the document feed roller 5 and a document feed clutch (not shown). A drive force from a drive source such as a motor is transmitted to the roller shaft of the document feed roller 5. The drive force is further transmitted to a roller shaft of the pickup roller 50 by a belt transmitting mechanism (not shown). In addition, when lowering the pickup arms 51, the document feed clutch is engaged and the drive force is also transmitted to the pickup arms 51. The pickup arms 51 are urged upward by a spring. When the document feed clutch is disengaged, the pickup arms 51 return to an uppermost position by the urging force of the spring and becomes under the standby state.

Each of the transportation rollers 7 is formed by a plurality of roller bodies fixed on a roller shaft in an axial direction at a prescribed interval between one another. For example, roller bodies made of silicon or EPDM are fixed on a metal roller shaft. A number and positions of the roller bodies are set appropriately according to, for example, a size of an original document to be transported. In the present embodiment, four transportation rollers 7a, 7b, 7c and 7d are supported axially in the paper guide 30 that constitutes the inner guide surface. With respect to each of the transportation rollers 7a, 7b, 7c and 7d, driven rollers 70 are provided at the outer guide surface so as to make contact with each of the transportation rollers 7a, 7b, 7c and 7d, respectively. The original document is nipped by the transportation rollers 7a, 7b, 7c and 7d and the driven rollers 70 and transported along the transportation path 3. In the same manner as the document feed roller 5, two driven rollers 70 facing two transportation rollers 7a and 7b located upstream of the U-turn part are supported axially by the ADF cover 102b. As shown in the drawing, when the ADF cover 102b is opened, the document feed roller 5 and these driven rollers 70 also swing upward. A contacting state of the document feed roller 5 and the separating pad 6 and a contacting state of the transportation rollers 7a and 7b and the driven rollers 70 are released, respectively. Accordingly, maintenance work and removal of jammed paper can be carried out.

The transportation roller 7a is provided at an uppermost stream side among the transportation rollers 7. The transportation roller 7a functions as a so-called resist roller. The outer guide surface of the transportation path 3 at the upstream of the transportation roller 7a is caved and a vertical width of the transportation path 3 is widened to form a resist space 32. A resist sensor 33 is provided at the outer guide surface of the transportation path 3 at the upstream of the transportation roller 7a. As described above, the leading edge of the original document separated by the document feed roller 5 and the separating pad 6 and fed into the transportation path 3 makes contact with the transportation roller 7a. In this case, the transportation roller 7a is under a stopped state. The leading edge of the original document makes contact with the transportation roller 7a and the original document bends. However, the bend of the original document is permitted by the resist space 32. By the original document being bent as described above, the leading edge of the original document is corrected in accordance with a roller surface of the transportation roller 7a. Then, in accordance with the detection signal of the resist sensor which detects the leading edge of the original document, the transportation roller 7a rotates. Accordingly, the skew of the original document is corrected and the original document is transported.

The CIS scanning unit 8 uses a CIS. Although details are not shown in the drawing, the CIS scanning unit 8 is a stationary typed scanning unit which focuses the reflected light from the original document irradiated by the light source onto a photoconductive element by a focusing fiber and carries out a scanning process. By being provided in the intermediate guide 31, the CIS scanning unit 8 is located at the inner side of the transportation path 3. In the lateral cross-section of the ADF 1, the CIS scanning unit 8 is provided between and below the separating pad 6 and the transportation roller 7a provided directly downstream of the separating pad 6, and between the scanning position P1 of the CCD scanning unit 12 and the document discharge rollers 9. The CIS adopted in the CIS scanning unit 8 has a narrow subject depth. At the outer side of the transportation path 3, a platen roller 80 is provided facing the CIS scanning unit 8 across the transportation path 3. The transported original document is contacted against the scanning surface of the CIS scanning unit 8 by the platen roller 80 and an image scanning process is carried out. As shown in FIG. 4, a side of the intermediate guide 31 located next to the document tray 2 can be opened with the proximity of the downstream edge of the upper surface of the intermediate guide 31 as a center of the swing. By opening the intermediate guide 31, the CIS scanning unit 8 also swings upward.

A pair of document discharge rollers 9 are provided downstream of the CIS scanning unit 8. In the same manner as the transportation rollers 7 or the like, a roller body made of silicon or EPDM is mounted on a metal roller shaft to form each of the document discharge rollers 9. The document discharge roller 9 located at the inner side of the transportation path 3 is supported by the intermediate guide 31. The document discharge roller 9 located at the outer side of the transportation path 3 is supported by the cover frame 102a. The document discharge rollers 9 are making contact and facing with one another. After the image scanning process, the document discharge rollers 9 discharge the scanned original document from the transportation path 3 onto the document discharge tray 4. As shown in the drawing, the document discharge rollers 9 are provided approximately below the separating pad 6. The position of the document discharge rollers 9 on the transportation path 3 is displaced with respect to the separating pad 6 and the separating pad holder 60. That is, the document discharge roller 9 provided on the intermediate guide 31 is provided not to interfere with the mounting hole 61 for fitting in the separating pad holder 60. As shown in FIG. 4, by opening the intermediate guide 31, the document discharge roller 9 located at the outer side of the transportation path 3 also swings upward with the CIS scanning unit 8. Therefore, by opening the intermediate guide 31, the document discharge roller 9 and the platen roller 80 or the like located at the outer side of the transportation path 3 are exposed. Accordingly, maintenance work and removal of jammed paper can be carried out.

As described above, the CIS scanning unit 8 provided at the inner side of the transportation path 3 is provided between and below the separating pad 6, the separating pad holder 60 and the transportation roller 7a located directly downstream of the separating pad 6, and between the scanning position P1 directly downstream of the U-turn part of the transportation path 3 and the document discharge rollers 9 provided in proximity to the outlet of the transportation path 3. Accordingly, the separating pad 6, the separating pad holder 60, the CIS scanning unit 8 and the document discharge roller 9 can be provided efficiently without interfering with one another in the intermediate guide 31 that forms the inner guide surface of the transportation path 3 formed in the sideways letter-U shape from the document tray 2 to the document discharge tray 4. As a result, the thickness of the intermediate guide 31 can be reduced. That is, the height of the space between the transportation path in proximity to the inlet and the transportation path in proximity to the outlet of the transportation path 3 can be reduced as much as possible. Therefore, the height of the ADF 1 can be reduced compared with a conventional ADF. As a result, the exterior of the ADF 1 improves and the center of gravity of the document pressing cover 102 having the ADF 1 becomes low. Accordingly, the operationality improves.

The document discharge rollers 9 are provided approximately below the separating pad 6 and the separating pad holder 60, at a position on the transportation path 3 displaced with respect to the separating pad holder 60. Accordingly, the outlet of the transportation path 3 is located in proximity to the inlet. As a result, the original document discharged from the outlet can easily be confirmed visually. In addition, the document discharge tray 4 located below the document tray 2 can be seen easily. The transportation path length from the scanning position P1 to the outlet becomes long. Accordingly, the surface located in proximity to the scanning position P2 where the CIS scanning unit 8 carries out an image scanning process can be horizontalized. Consequently, the displacement of the nipped state of the CIS scanning unit 8 and the platen roller 80 and the generation of the jammed paper can be suppressed. As a result, the image scanning process can be carried out stably by the CIS scanning unit 8 and the quality of the scanned image improves.

Figure 5A:
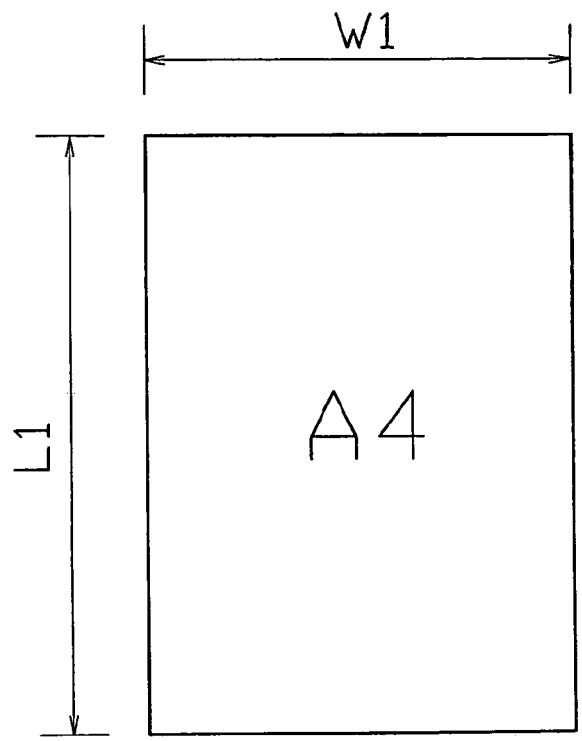
FIG. 5A shows an A4 size original document having a document length L1 and a document width W1.
Figure 5B:
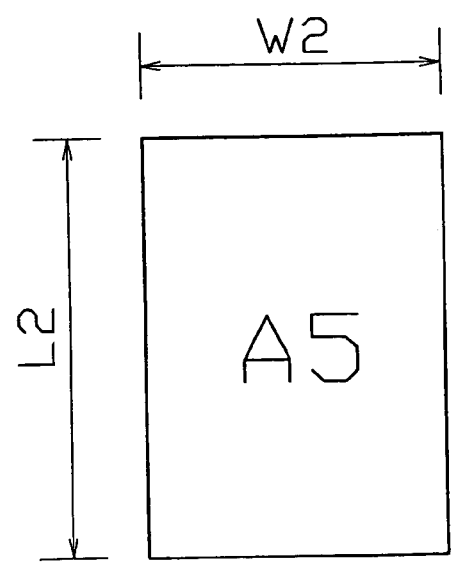
FIG. 5B shows an A5 size original document having a document length L2 and a document width W2.
Figure 8:
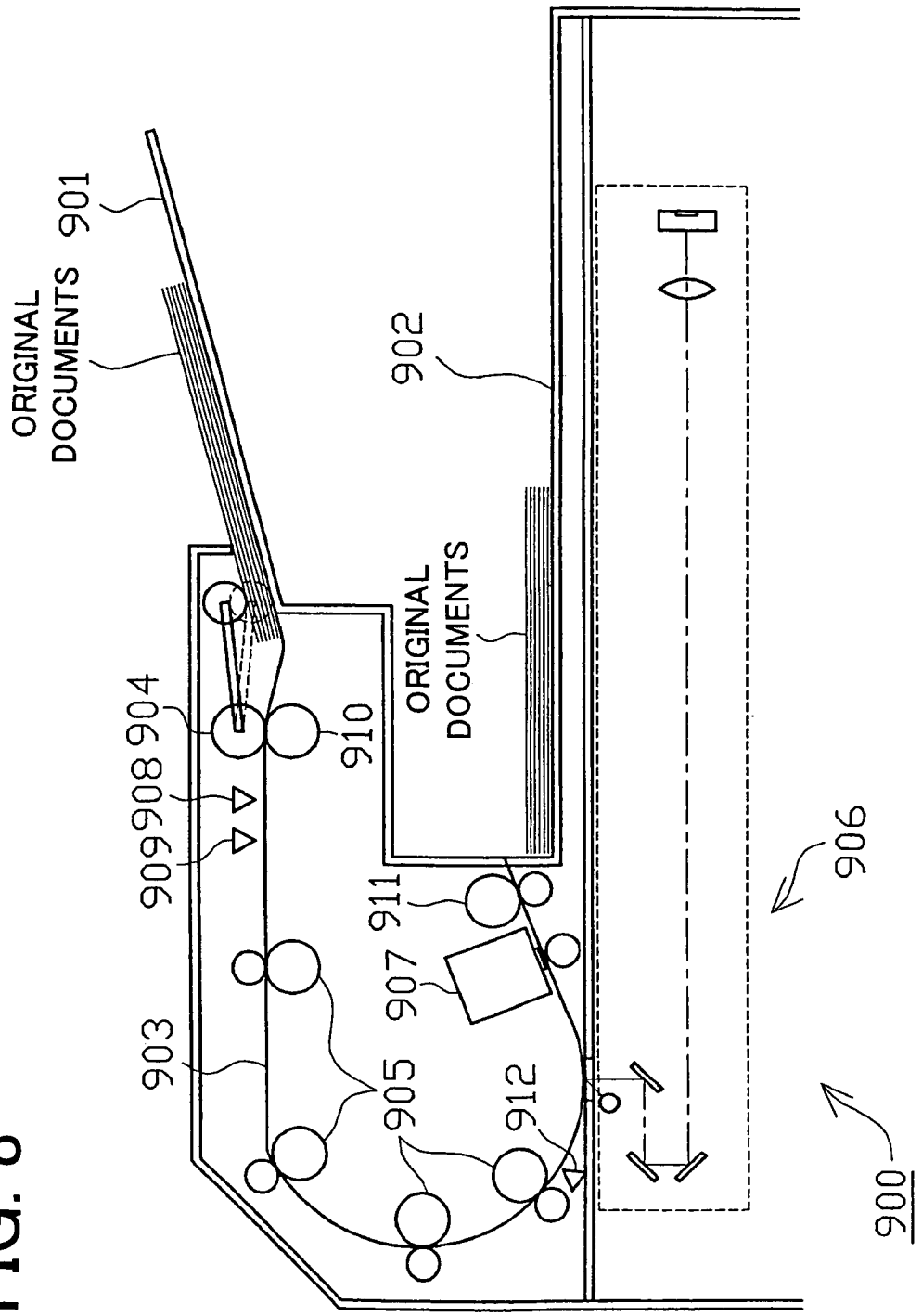
FIG. 8 is a cross-sectional view showing the ADF of the conventional copy-and-facsimile MFP 900.

Next, a size sensor of the ADF 1 will be described. A document length sensor 34 and a document width sensor 35 are provided along the transportation path 3 of the ADF 1. Before an image of the original document is scanned by the CCD scanning unit 12, the document size is distinguished automatically. For example, as shown in FIGS. 5A and 5B, suppose that an A4 size original document has a document length L1 and a document width W1, and an A5 size original document has a document length L2 and a document width W2. Then, the document width W1 of the A4 size original document and the document length L2 of the A5 size original document are the same. The ADF 1 can transport both the A4 size original document and the A5 size original document in either a portrait direction or a landscape direction. In other words, the ADF 1 can transport the original document in both a lengthwise direction and a widthwise direction. Therefore, for example, a lengthwise direction of the A4 size original document and a widthwise direction of the A5 size original document cannot be distinguished only by the document length sensor 34. Thus, the document length and the document width of the transported original document are detected by the document length sensor 34 and the document width sensor 35, and the document size and the transportation direction are distinguished.

Meanwhile, the document width which can be scanned by the CCD scanning unit 12 and the CIS scanning unit 8 is limited. Therefore, original documents larger than the A4 size, for example, a B4 size original document and an A3 size original document, can be transported only in the lengthwise direction in the ADF 1. Thus, if the transported original document is detected to be longer than the document length L1 of the A4 size original document by the detection signal of the document length sensor 34, the document size of the transported original document can be distinguished to be B4 size or A3 size in accordance with the detection signal of the document width sensor 35.

As shown in FIG. 6, the document length sensor 34 and the document width sensor 35 are provided directly downstream of the document feed roller 5. As shown in FIG. 7, an image scanning control unit receives the detection signals from the document length sensor 34 and the document width sensor 35 and distinguishes the document size of the transported original document. Specifically, the image scanning control unit receives signals detecting the leading edge and the trailing edge of the original document from the document length sensor 34. Then, in accordance with a number of steps of a motor from the detection of the leading edge until the detection of the trailing edge, the image scanning control unit calculates the document length. Meanwhile, the document width sensor 35 includes a plurality of sensors arranged in the width direction of the transportation path 3 from one end to a prescribed position of the transportation path 3 so as to respond to each of the document widths of various document sizes such as A5 size, B5 size, A4 size and B4 size.

In accordance with the detection signals of the plurality of the sensors, the image scanning control unit distinguishes the document width. In accordance with the document length and the document width, the image scanning control unit transmits document size information to a main control unit of the copy-and-facsimile MFP 100. Further, the document size information includes the document size and the transportation direction. In accordance with the document size information, the main control unit selects paper and prints out the scanned image or carries out a facsimile transmission. As described above, in accordance with the detection signals of the document length sensor 34 and the document width sensor 35 provided along the transportation path 3, the image scanning control unit can automatically distinguish the document size of the transported original document. Thus, the ADF 1 of the present embodiment is especially advantageous in that even when original documents of different sizes are placed on the document tray 2, the document size of each of the original documents can be distinguished automatically.

As shown in FIG. 6, a first read sensor 36 is provided at the transportation path 3 directly upstream of the scanning position P1. The first read sensor 36 detects the leading edge and the trailing edge of the transported original document. In accordance with the detection signal, the image scanning control unit controls the CCD scanning unit 12 so that, for example, after a prescribed number of counts from the detection of the leading edge of the original document, the CCD scanning unit 12 starts an image scanning process and after a prescribed number of counts from the detection of the trailing edge of the original document, the CCD scanning unit 12 stops the image scanning process. In the same manner, a second read sensor 37 is provided at the transportation path 3 directly upstream of the scanning position P1. In accordance with a detection signal of the second read sensor 37, the image scanning control unit controls the CIS scanning unit 8.

Each of the image information scanned by the CCD scanning unit 12 and the CIS scanning unit 8 is transmitted from the image scanning control unit to the main control unit. When considering the fact that a data volume of the image information is large, a data transmission speed from the image scanning control unit to the main control unit and processes of the main control unit such as a printing operation and facsimile transmission, the above-described document size information is preferable to be transmitted to the main control unit prior to the image information. Therefore, before the leading edge of the original document transported along the transportation path 3 is detected by the first read sensor 36, the document length sensor 34 is required to have completed detecting the leading edge and the trailing edge of the original document. Thus, the length of the transportation path 3 from the document length sensor 34 to the first read sensor 36, in other words, the transportation path length is set longer than the document length L1 of the A4 size original document. Further, the transportation path length is set in consideration of the maximum scannable size of the original document. In the ADF 1 of the present embodiment, as described above, the original document of B4 size or larger is transported only in the lengthwise direction and the document size is distinguished by the document length sensor 34 and the document width sensor 35. Therefore, the transportation path length is set longer than the document length L1 of the A4 size original document. However, if the maximum document size and a degree of freedom in the transportation direction are different, the transportation path length also becomes different.

In case the transportation path length is set longer than the document length L1 of the A4 size original document as in the ADF 1 of the present embodiment, as shown in FIG. 3, a length of the transportation path 3 from the inlet to the first read sensor 36 becomes long. In addition, in general, the scanning position P1 is located at a different position from the platen glass 11 for using the document placing table 101 as the FBS. The scanning position P1 is set directly downstream of the U-turn part of the transportation path 3. Therefore, a part of the transportation path 3 located upstream of the scanning position P1 is extended in a rightward direction in FIG. 3. However, if a part of the transportation path 3 located downstream of the scanning position P1 is formed in the same manner as in a conventional ADF, the outlet of the transportation path 3 is located at an inward position compared with the inlet. In this case, the original document discharged onto to the document discharge tray 4 becomes difficult to be confirmed visually and difficult to be taken out. As described above, in case the document length sensor 34 and the document width sensor 35 for distinguishing the document size of the transported original document are provided along the transportation path 3 of the ADF 1, by providing the document discharge rollers 9 approximately below the separating pad 6 and the separating pad holder 60, at a position on the transportation path 3 displaced with respect to the separating pad holder 60, the outlet of the transportation path 3 is located in proximity to the inlet. As a result, the original document discharged from the outlet can easily be confirmed visually and the document discharge tray 4 provided below the document tray 2 can be seen easily.

Further, the structure of the copy-and-facsimile MFP 100 of the present embodiment is just one example of the automatic document transportation device of the present invention. There are variations to the above-described automatic document transportation device without departing from the scope of the present invention. For example, the automatic document transportation device of the present invention can be implemented in a single function machine such as a copy machine, a facsimile machine and a scanner.

The invention claimed is:

1. An automatic document transportation device, comprising:
    a document tray and a document discharge tray which are provided vertically in two stages;
    a transportation path which is formed in a sideways letter-U shape from the document tray to the document discharge tray;
    means for separating original documents fed from the document tray by nipping the original documents in a thickness direction which is provided in proximity to an inlet of the transportation path;
    transportation rollers which are provided appropriately along the transportation path and nip and transport the original document, including first transportation rollers provided directly downstream of the means for separating without any intervening rollers in the transportation path between the means for separating and the first transportation rollers;
    means for scanning a first side of the transported original document which is provided on an outer side of the transportation path directly downstream of a U-turn part of the transportation path;
    means for scanning a second side of the transported original document which is provided on an inner side of the transportation path downstream of a scanning position of the means for scanning the first side; and
    document discharge rollers which are provided in proximity to an outlet of the transportation path and nip and discharge the scanned original document onto the document discharge tray,
    wherein in a lateral cross-section of the automatic document transportation device, the means for scanning the second side is provided between and below the means for separating and the first transportation rollers, and between the means for scanning the first side and the document discharge rollers.

2. The automatic document transportation device according to claim 1, wherein the document discharge rollers are provided approximately below the means for separating, at a position on the transportation path displaced with respect to the means for separating.

3. The automatic document transportation device according to claim 1, wherein a size sensor is provided at the transportation path upstream of the means for scanning the first side and detects a leading edge and a trailing edge of the transported original document;
    a read sensor is provided directly upstream of the means for scanning the first side and controls a scanning operation; and
    a transportation path length from the size sensor to the read sensor is longer than a document length for distinguishing a maximum scannable document size.

4. The automatic document transportation device according to claim 2, wherein a size sensor is provided at the transportation path upstream of the means for scanning the first side and detects a leading edge and a trailing edge of the transported original document;
    a read sensor is provided directly upstream of the means for scanning the first side and controls a scanning operation; and
    a transportation path length from the size sensor to the read sensor is longer than a document length for distinguishing a maximum scannable document size.

5. The automatic document transportation device according to claim 1, wherein the means for scanning the second side is provided between and below the means for separating in proximity to the inlet of the transportation path and the transportation rollers provided directly downstream of the means for separating.

6. The automatic document transportation device according to claim 1, wherein the means for scanning the second side is provided between the means for scanning the first side directly downstream of the U-turn part and the document discharge rollers provided in proximity to the outlet of the transportation path.

7. The automatic document transportation device according to claim 1, wherein the means for separating, the transportation rollers, the means for scanning the first side, the means for scanning the second side and the document discharge rollers are provided efficiently without interfering with one another along the transportation path formed in the sideways letter U-shape from the document tray to the document discharge tray.

8. An automatic document transportation device, comprising:
    a document tray and a document discharge tray which are provided vertically in two stages;
    a transportation path which is formed in a sideways letter-U shape from the document tray to the document discharge tray;
    separating unit that separates original documents fed from the document tray by nipping the original documents in a thickness direction which is provided in proximity to an inlet of the transportation path;

transportation rollers which are provided appropriately along the transportation path and nip and transport the original document, including first transportation rollers provided directly downstream of the separating unit without any intervening rollers in the transportation path between the separating unit and the first transportation rollers;

a first scanning unit that scans a first side of the transported original document which is provided on an outer side of the transportation path directly downstream of a U-turn part of the transportation path;

a second scanning unit that scans a second side of the transported original document which is provided on an inner side of the transportation path downstream of a scanning position of the first scanning unit; and document discharge rollers which are provided in proximity to an outlet of the transportation path and nip and discharge the scanned original document onto the document discharge tray, wherein in a lateral cross-section of the automatic document transportation device, the second scanning unit is provided between and below the separating unit and the first transportation rollers, and between the first scanning unit and the document discharge rollers.

9. The automatic document transportation device according to claim 8, wherein the document discharge rollers are provided approximately below the separating unit, at a position on the transportation path displaced with respect to the separating unit.

10. The automatic document transportation device according to claim 8, wherein a size sensor is provided at the transportation path upstream of the first scanning unit and detects a leading edge and a trailing edge of the transported original document;

a read sensor is provided directly upstream of the first scanning unit and controls a scanning operation; and a transportation path length from the size sensor to the read sensor is longer than a document length for distinguishing a maximum scannable document size.

11. The automatic document transportation device according to claim 9, wherein a size sensor is provided at the transportation path upstream of the first scanning unit and detects a leading edge and a trailing edge of the transported original document;

a read sensor is provided directly upstream of the first scanning unit and controls a scanning operation; and a transportation path length from the size sensor to the read sensor is longer than a document length for distinguishing a maximum scannable document size.

12. The automatic document transportation device according to claim 8, wherein the second scanning unit is provided between and below the document separating unit in proximity to the inlet of the transportation path and the transportation rollers provided directly downstream of the document separating unit.

13. The automatic document transportation device according to claim 8, wherein the second scanning unit is provided between the first scanning unit directly downstream of the U-turn part and the document discharge rollers provided in proximity to the outlet of the transportation path.

14. The automatic document transportation device according to claim 8, wherein the document separating unit, the transportation rollers, the first scanning unit, the second scanning unit and the document discharge rollers are provided efficiently without interfering with one another along the transportation path formed in the sideways Letter U-shape from the document tray to the document discharge tray.

15. A method for automatically transporting original documents, comprising:

providing a document tray and a document discharge tray vertically in two stages;

forming a transportation path in a sideways letter-U shape from the document tray to the document discharge tray;

separating original documents fed from the document tray by nipping the original documents in a thickness direction with a separating unit in proximity to an inlet of the transportation path;

providing transportation rollers appropriately along the transportation path for nipping and transporting the original document, including first transportation rollers provided directly downstream of the separating unit without any intervening rollers in the transportation path between the separating unit and the first transportation rollers;

scanning a first side of the transported original document at an outer side of the transportation path directly downstream of a U-turn part of the transportation path;

scanning a second side of the transported original document at an inner side of the transportation path downstream of a scanning position of a first scanning unit;

providing document discharge rollers in proximity to an outlet of the transportation path for nipping and discharging the scanned original document onto the document discharge tray; and providing a second scanning unit between and below the separating unit and the first transportation rollers, and between the first scanning unit and the document discharge rollers in a lateral cross-section.

16. The method for automatically transporting original documents according to claim 15, further comprising providing the document discharge rollers approximately below the separating unit, at a position on the transportation path displaced with respect to the separating unit.

17. The method for automatically transporting original documents according to claim 15, further comprising:

providing a size sensor at the transportation path upstream of the first scanning unit;

detecting a leading edge and a trailing edge of the transported original document;

providing a read sensor directly upstream of the first scanning unit to control a scanning operation; and forming a transportation path length from the size sensor to the read sensor longer than a document length for distinguishing a maximum scannable document size.

18. The method for automatically transporting original documents according to claim 15, further comprising providing the second scanning unit between and below the document separating unit in proximity to the inlet of the transportation path and the transportation rollers provided directly downstream of the document separating unit.

19. The method for automatically transporting original documents according to claim 15, further comprising providing the second scanning unit between the first scanning unit directly downstream of the U-turn part and the document discharge rollers provided in proximity to the outlet of the transportation path.

20. The method for automatically transporting original documents according to claim 15, further comprising providing the document separating unit, the transportation rollers, the first scanning unit, the second scanning unit and the document discharge rollers efficiently without interfering with one another along the transportation path formed in the sideways letter U-shape from the document tray to the document discharge tray.

* * * * *